June 7, 1927.  1,631,619
G. A. BUVINGER ET AL
PUMPING APPARATUS
Filed Aug. 25, 1924
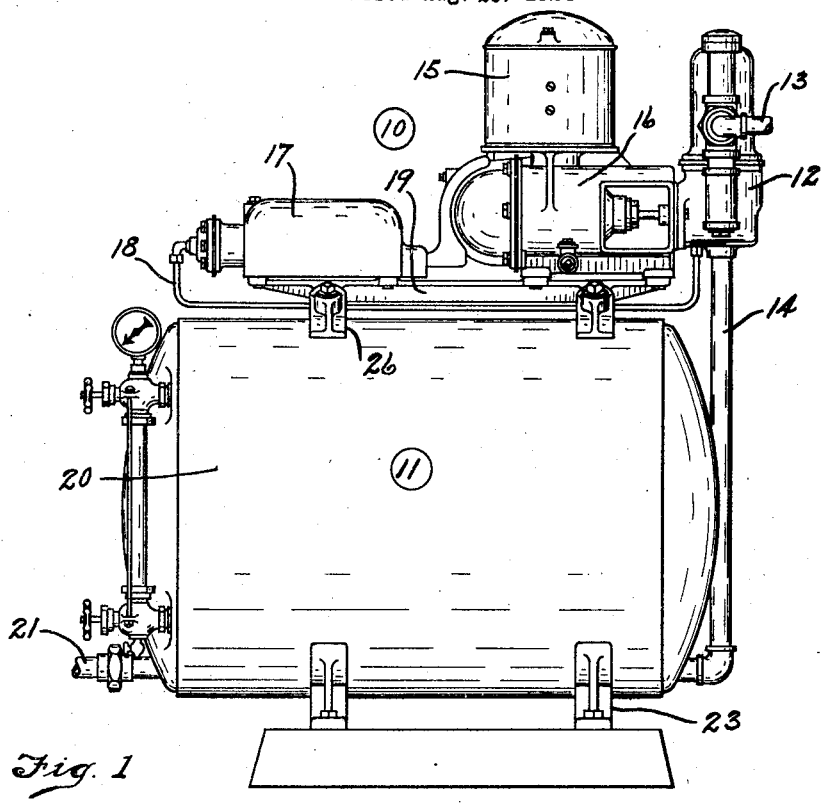
Fig. 1
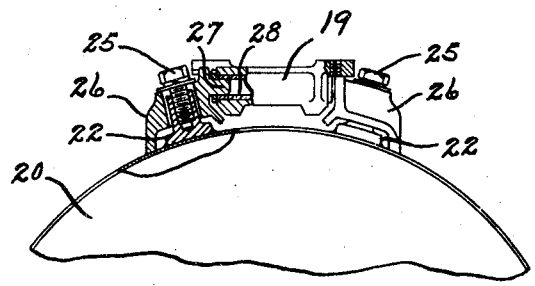
Fig. 2
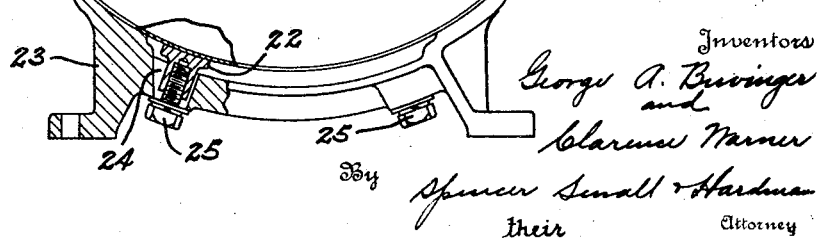

Patented June 7, 1927.

1,631,619

UNITED STATES PATENT OFFICE.

GEORGE A. BUVINGER AND CLARENCE WARNER, OF DAYTON, OHIO, ASSIGNORS TO DELCO LIGHT COMPANY, OF DAYTON, OHIO, A CORPORATION OF DELAWARE.

PUMPING APPARATUS.

Original application filed March 19, 1923, Serial No. 626,174. Divided and this application filed August 25, 1924. Serial No. 733,875.

The present invention relates to pumps of the type for supplying a fluid to a storage tank, and more particularly to the mounting of the pump and tank. The present application is a division of our copending application, Serial No. 626,174, filed March 19, 1923.

Among the objects of the invention is to provide a simple and compact pump unit including the pump, driving mechanism, and pressure storage tank which is adapted to be assembled as a unit and shipped in assembled condition to the user with a minimum amount of plumbing and electrical wiring for the installation of the pumping outfit.

A further object is to utilize the storage tank as part of the frame for supporting the pump and driving mechanism instead of using separate supporting means.

Further objects and advantages of the present invention will be apparent from the following description, reference being had to the accompanying drawings, wherein a preferred form of the present invention is clearly shown.

Fig. 1 is a side elevation of a preferred embodiment of the machine; and

Fig. 2 is an end view partly in elevation and partly in section of the supporting structure of the unit.

This invention contemplates the making of a pumping outfit by assembling together a number of previously completed subassemblies or subunits, namely, a pump unit 10 and a tank unit 11 in which the tank is employed as a supporting structure for the unit. The pump unit 10 comprises a pump 12 having an inlet pipe 13 and an outlet pipe 14 connected with a motor 15 through suitable driving mechanism contained within a casing 16. The motor 15 is started and stopped automatically in response to certain pressures in the system by a controller 17 connected with a pressure pipe 18. This mechanism is carried by a pump base 19.

The tank unit 11 includes a storage tank 20 which is connected with the pump 12 by the pipe 14, and which is provided with an outlet pipe 21. Tapped lugs 22 are secured by welding or otherwise, adjacent the top and bottom of the tank 20. The tank 20 rests upon brackets or supporting bases 23 which are perforated as at 24 to receive the lugs or nipples 22. The tapped lugs 22 receive bolts 25 by which the tank 20 is detachably secured to base 23.

The lugs or nipples 22 at the top of tank 20 project into perforated pump base brackets 26. Brackets 26 include bosses 27 which extend into sleeves 28 of rubber or other vibration-absorbing material carried in openings in the base 19. The brackets 26 are detachably secured to the tank 20 and the base 19 is detachably secured to the brackets 26 by the bolts 25.

It is apparent, therefore, that the construction of the pump has been simplified and is arranged to facilitate repairs of certain units. The pump unit 10 can be readily removed by removing the upper bolts 25. Then the tank can be removed by removing the lower bolts. Also the present invention provides for the assembling together of a number of previously completed assemblies, and therefore, the present invention minimizes the cost of manufacture of pumping apparatuses.

While the form of embodiment of the invention as herein disclosed, constitutes a preferred form, it is to be understood that other forms might be adopted, all coming within the scope of the claims which follow.

What is claimed is as follows:

1. Pumping apparatus comprising, in combination, a tank, a base structure, a pump support structure, and means for connecting one of said structures with the tank included a threaded member permanently attached to the tank and a threaded member co-operating therewith for securing the tank to one of said structures.

2. Pumping apparatus comprising, in combination, a base, a tank, a unitary structure including a pump, threaded members permanently attached to the tank adjacent the base and said structure, and threaded members co-operating with the first named members for securing said tank to said base and to said structure.

3. Pumping apparatus comprising, in combination, a base, a tank carried by said base, a unitary structure including a pump supported by said tank, threaded members permanently attached to the tank adjacent the base and said structure, and screws co-operating with the members for securing said tank to the base and said structure to the tank.

4. Pumping apparatus comprising, in combination, a tank and a supporting structure; a unitary structure including a pump supported by the tank; tapped lugs attached to the tank; and screws cooperating with said structures and lugs for securing the structures and tank together.

5. Pumping apparatus comprising, in combination, a tank, a base structure, a pump support structure, and means for connecting one of said structures with the tank including a nipple permanently attached to the tank and a member co-operating with said nipple for detachably securing the tank to one of said structures.

6. Pumping apparatus comprising, in combination, a tank, a base structure, a pump support structure, and means for connecting said structures with the tank including nipples permanently attached to the tank and members co-operating with said nipples for detachably securing the tank to said structures.

In testimony whereof we hereto affix our signatures.

GEORGE A. BUVINGER.
CLARENCE WARNER.